United States Patent [19]

Stouffer et al.

[11] Patent Number: 5,316,780
[45] Date of Patent: May 31, 1994

[54] METHOD FOR EXTRACTING CHOLESTEROL FROM EGG YOLK

[75] Inventors: Scott C. Stouffer, Evanston; Lisa J. Majeres, Chicago; Wibul Charintranond, Elmhurst, all of Ill.

[73] Assignee: Kraft General Foods, Inc., Northfield, Ill.

[21] Appl. No.: 960,910

[22] Filed: Oct. 14, 1992

[51] Int. Cl.⁵ .............................................. A23L 1/32
[52] U.S. Cl. ................................... 426/424; 426/429; 426/519; 426/614
[58] Field of Search ............... 426/614, 422, 424, 425, 426/429, 437, 519, 520; 366/340, 341, 337, 176, 174, 269

[56] References Cited

U.S. PATENT DOCUMENTS

| | | | |
|---|---|---|---|
| 3,744,762 | 7/1973 | Schlicht | 366/174 |
| 4,000,086 | 12/1976 | Stoev et al. | 366/176 |
| 4,204,775 | 5/1980 | Speer | 366/336 |
| 4,755,325 | 7/1988 | Osgerby | 366/176 |
| 5,091,203 | 2/1992 | Conte, Jr. et al. | 426/614 |

*Primary Examiner*—Donald E. Czaja
*Assistant Examiner*—Anthony Weier
*Attorney, Agent, or Firm*—Fitch, Even, Tabin & Flannery

[57] ABSTRACT

The present invention is directed to a method for extracting cholesterol from egg yolk. In accordance with the method, a mixture of egg yolk solids, water and oil is provided. The mixture is then subjected to moderate shear extraction conditions by repetitively pumping the mixture in a flowing stream through a conduit provided with at least one small diameter orifice and at least one screen mounted transversely to the direction of flow of the flowing stream. The mixture is then separated into water and oil phases by centrifugation to provide an oil phase which retains the cholesterol and a water phase which contains the egg solids.

5 Claims, 2 Drawing Sheets

METHOD FOR EXTRACTING CHOLESTEROL FROM EGG YOLK

FIELD OF THE INVENTION

The present invention relates to a process for reducing the amount of cholesterol in egg yolk. More particularly, the present invention is directed to a decholesterolization process for egg yolk which utilizes relatively low shear mixing.

BACKGROUND OF THE INVENTION

Physicians and health organizations currently agree that the lipid phase of a diet should provide an optimal balance between polyunsaturated and saturated fats. There has been shown to be a correlation between heart and circulatory diseases and diets containing higher amounts of cholesterol and saturated fats. It is therefore desirable to reduce whenever possible, the amount of cholesterol and saturated fat in foods and in raw materials which are used in food production.

Egg yolk has a large application in foods and as it is an efficient emulsifying agent, it is an essential ingredient in mayonnaises, cake batters containing fats, cream puffs, bakery goods and candies.

Egg yolk contains a high level of cholesterol and saturated fats and is itself an emulsion comprising a dispersion of oil droplets in a continuous phase of aqueous components. It has a total solid content of approximately 50% to 52% composed of 15.5% to 16.5% protein, 31.5% to 34.5% lipid, 0.5% to 1.5% carbohydrate and 0.9% to 1.2% ash.

The egg yolk lipids comprise as their main components approximately 65% triglyceride, 29% phospholipid and 5% cholesterol. The high amount of self emulsifying -phospholipids, wherein the highest hydrophilic component is phosphatidylcholine representing 75% of the total, makes egg yolk a very stable emulsion in addition to being an emulsifying agent.

Substantial research effort has been directed to removal of cholesterol from egg yolks as well as food products which include these materials as ingredients. A variety of approaches to remove cholesterol from egg yolks have been tried. One approach utilizes microorganisms to enzymatically oxidize and degrade cholesterol [Japanese Patent 60-18375]. This method produces cholesterol oxidation products which may be undesirable. Organic solvents have also been used to extract cholesterol [Japanese 48/44458, U.S. Pat. Nos. 4,104,286, 3,881,034, 3,563,765, 4,234,619 and Tokarska, et al., *Can. Inst. Food Sci. Tech. J.*, 18:256-258 (1985)]. Such methods remove a substantial portion of the triglyceride oils, and may involve significant processing steps to remove solvents. These solvents are used to extract the cholesterol from the egg yolk. Even with supercritical carbon dioxide as the solvent, selectivity of cholesterol over triglycerides may be limited [Prepared Foods, 157:186 (1988); Japanese 59-135847]. Edible vegetable oils have also been used to extract cholesterol from egg yolks, as described in U.S. Pat. Nos. 3,717,414, 4,103,040 and 4,333,959. However, each of the processes described in these vegetable oil patents requires the use of high shear mixing treatment to attain adequate extraction transfer of the cholesterol from the egg yolk to the vegetable oil.

U.S. Pat. No. 4,804,555 discloses a process for the simultaneous deodorization and cholesterol level reduction of fish oils. The fish oil is deaerated, mixed with steam, heated, flash vaporized, thin film-stripped with a countercurrent stream and cooled. U.S. Pat. No. 2,234,619 discloses a method for cholesterol removal from eggs by dehydrating the eggs, extracting the cholesterol with liquid dimethyl ether under anhydrous conditions and removing the dimethyl ether by treatment under reduced pressure at low temperatures. U.S. Pat. No. 4,104,286 describes the isolation of cholesterol from eggs through extraction with ethanol, saponification in an aqueous ethanolic alkali metal hydroxide and concentration and purification with a hydrocarbon solvent and methanol.

Thus, it would be desirable to provide egg products having the desirable functional characteristics of egg yolk products (e.g., protein and phospholipids), while reducing the cholesterol level and increasing the polyunsaturated fat to saturated fat ratio. It would further be desirable to do this while retaining the functionality, appearance and taste of natural eggs which would yield good texture upon being cooked.

It is therefore a principal object of this invention to produce egg yolks and egg products therefrom which are substantially lower in cholesterol than normal egg. It is a further object of the invention to produce egg yolk and egg products therefrom which have a polyunsaturated fat to saturated fat ratio of 1 or greater, i.e., the polyunsaturated fat content is equal to or greater than the saturated fat content. In achieving the above objects, it is an overall object of this invention to obtain egg products having the functionality of natural eggs.

SUMMARY OF THE INVENTION

The present invention is directed to a method for extracting cholesterol from egg yolk. In accordance with the method, a mixture of egg yolk solids, water and oil is provided. The mixture is then subjected to moderate shear extraction conditions by repetitively pumping the mixture in a flowing stream through a conduit provided with at least one small diameter orifice and at least one screen mounted transversely to the direction of flow of the flowing stream. The mixture is then separated into water and oil phases by centrifugation to provide an oil phase which retains the cholesterol and a water phase which contains the egg solids.

DETAILED DESCRIPTION OF THE INVENTION

Generally, in accordance with the present invention, cholesterol is removed from egg yolks by forming a premix of egg yolk solids, water and vegetable oil. The premix is subjected to a low shear mixing process by pumping the premix through a conduit containing an orifice in proximity to a screen. In one embodiment of the invention, the premix of oil and egg yolk is pumped in a recirculating loop from a holding tank back to the holding tank. Pumping is continued for a time sufficient to subject all portions of the premix to passage through the orifice and the screen for from 10 to 25 times.

The egg yolk can be fresh egg yolk, frozen egg yolk or reconstituted dried egg yolk. If dried egg yolk is used, the egg yolk is reconstituted with sufficient water to provide at least a level of water normally associated with egg yolk, i.e., about 50% egg yolk solids and 50% water. In general, the premix of the present invention can contain from about 10 to about 32% egg yolk solids (dry basis), from about 35% to about 80% vegetable oil, and from about 10% to about 35% water. All percentages used herein are by weight unless otherwise indicated. A limiting factor in formulating the premix of egg yolk solids, water and oil is that at higher water levels, the cholesterol removal rate is increased; however, if too much water is added, an oil-in-water emulsion may be formed. An oil-in-water emulsion is more difficult to separate into oil and egg yolk phases and should be avoided. The low shear mixing process of the present invention, is extremely efficient in preventing the formation of oil-in-water emulsions.

Figure 1:
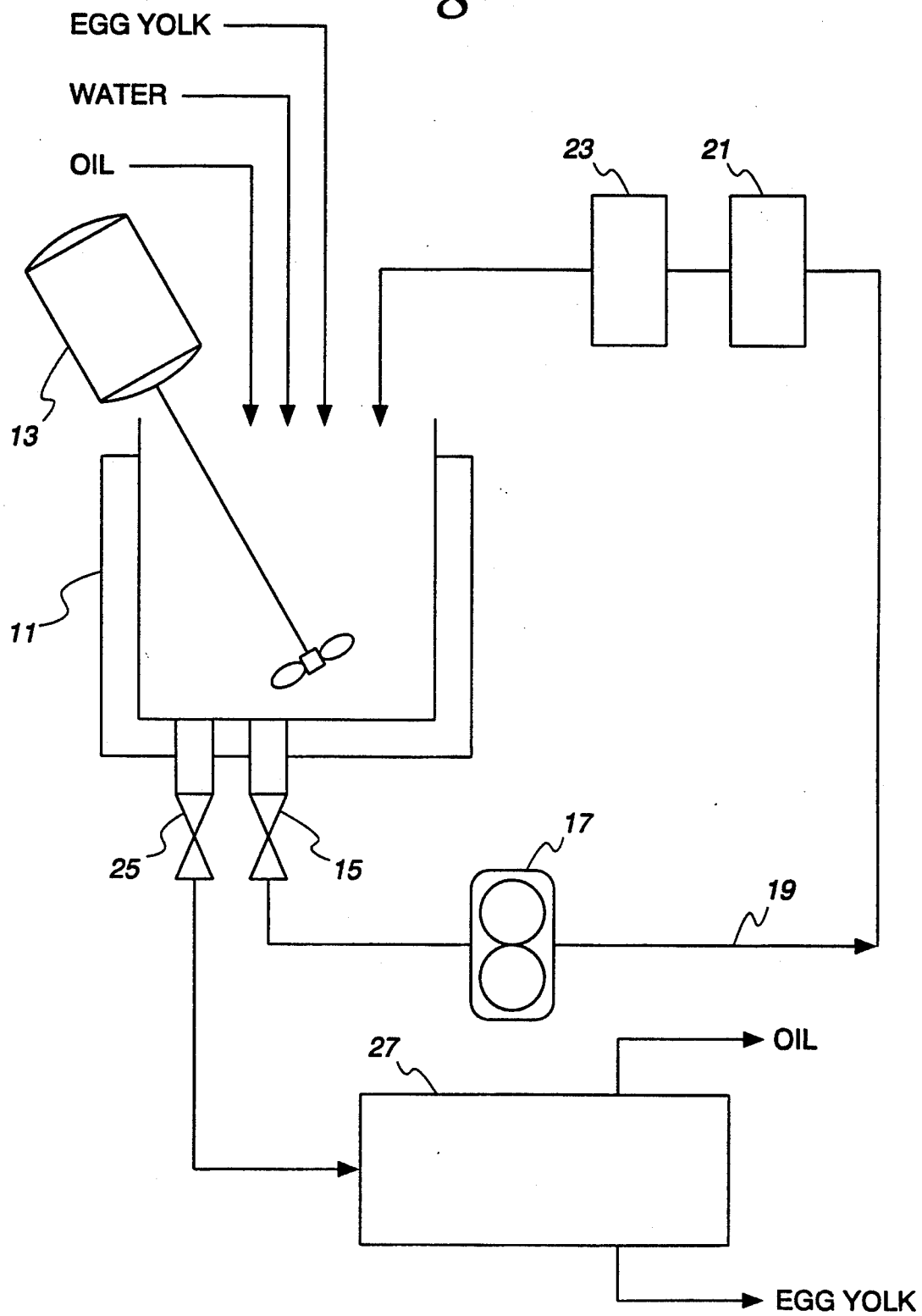
FIG. 1 is a schematic flow diagram of one embodiment of the method of the invention.

As shown in FIG. 1, the egg yolk solids, water and oil are added to a mixing tank 11 and are formed into a mixture with a low shear mixer, such as propeller mixer 13. A valve 15 is opened and the mixture is pumped by a suitable pump, such as a positive displacement pump 17 through conduit 19. The conduit 19 is in the form of a loop from the bottom of mixing tank 11 and back to the top of mixing tank 11. Disposed in conduit 19 is an orifice 21 and a screen 23. Passage of the mixture through the orifice 21 results in the creation of turbulent flow having a higher Reynolds number than the Reynolds number of flow through the conduit 19. The Reynolds number established by orifice 21 is preferably in the range of from at least about 4000 to about 12000. The creation of turbulent flow by passage of the mixture through orifice 21 results in increasing contact between the egg solids and the oil to aid in extracting the cholesterol from the egg solids to the oil. The screen 23 is located within from about 6 to about 24 inches from the orifice 21 so that the turbulent flow is still present when the mixture passes through the screen 23. The screen 23 preferably has a mesh size of from about 40 to about 50 mesh U.S. standard sieve size. The screen 23 further divides the flowing stream of the mixture into discrete particles which again aid in contacting the oil with the egg yolk to aid in extracting cholesterol from the egg yolk.

Prior to beginning the recirculation of the flowing stream of the mixture of egg yolk solids, water and oil, the mixture is heated in the tank 11 to a temperature in the range of from about 125° F. to about 150° F. This aids in reducing the viscosity of the mixture and lessens the pressure required to attain a suitable mass flow rate of the mixture in the conduit 19. The pump 17 is operated so as to not impart a pressure higher than about 180 psig to the flowing stream of the mixture. In general, the pressure drop from pump 17 to the point of reintroduction of the flowing stream of the mixture into tank 11 is in the range of about 120 psig to about 150 psig. This is an extremely low pressure drop compared to the high shear mixing steps used in prior art methods for extracting cholesterol from egg yolk using a vegetable oil. Pumping of the mixture is continued until each part of the flowing stream of the mixture has passed through the orifice 21 and the screen 23 for at least 10 times and preferably in the range of from about 12 to about 35 times. Expressed in another way, the flowing stream of the mixture is passed through the orifice and screen for a number of times which is equivalent to passing the flowing stream of the mixture through a series of orifices and screens equivalent to at least 10 and preferably from about 12 to about 35 pairs of orifices and screens.

For a one inch inside diameter pipe, the orifice size should be in the range of from about $\frac{3}{8}$ inch to about $\frac{1}{2}$ inch, preferably $\frac{3}{8}$ inch. For larger diameter pipes, the orifice size can be larger and in general, the ratio of orifice sizes should be maintained the same as for the one inch size. For the one inch conduit, the flow rate of the mixture in the conduit 19 should be in the range of from about 50 to about 200 pounds per hour to establish the desirable turbulent conditions by passage through the orifice 21 and the screen 23.

Utilizing the simple processing system of the present invention, upwards of 70% of the cholesterol and 50% of the native saturated fat can be removed from the egg yolk solids. Cholesterol removal in the range of from about 70% to about 80% is typical. After the cholesterol has been extracted from the egg yolk solids into the oil, the oil containing cholesterol is easily separated from the mixture by centrifugation. The valve 25 is open to pass the mixture from tank 11 to a centrifugal separator 27 to provide a cholesterol enriched oil phase and a cholesterol and saturated fat depleted egg yolk phase. The egg yolk solids which are recovered have had up to about 60% of the native saturated fat removed. Some of this saturated fat is replaced by the unsaturated vegetable oil used in the process. The oil level of the decholesterolized egg yolk can be adjusted to the original oil level of the egg yolk by addition of unsaturated vegetable oil. After separating the oil from the egg yolk in centrifugal separator 27, the cholesterol contained in the oil may be removed by steam stripping and the oil can then be recycled.

Any of the edible vegetable and animal fats and oils which are liquid at the temperature of processing can be used as the extraction oil in the present invention. Oils of particular interest are vegetable oils, particularly polyunsaturated oils. Suitable vegetable oils include safflower oil, corn oil, sunflower oil, soybean oil, canola oil, olive oil, peanut oil, cottonseed oil, coconut oil, palm oil and mixtures thereof. Most preferably, soybean oil or safflower oil are used as the vegetable oil.

Figure 2:
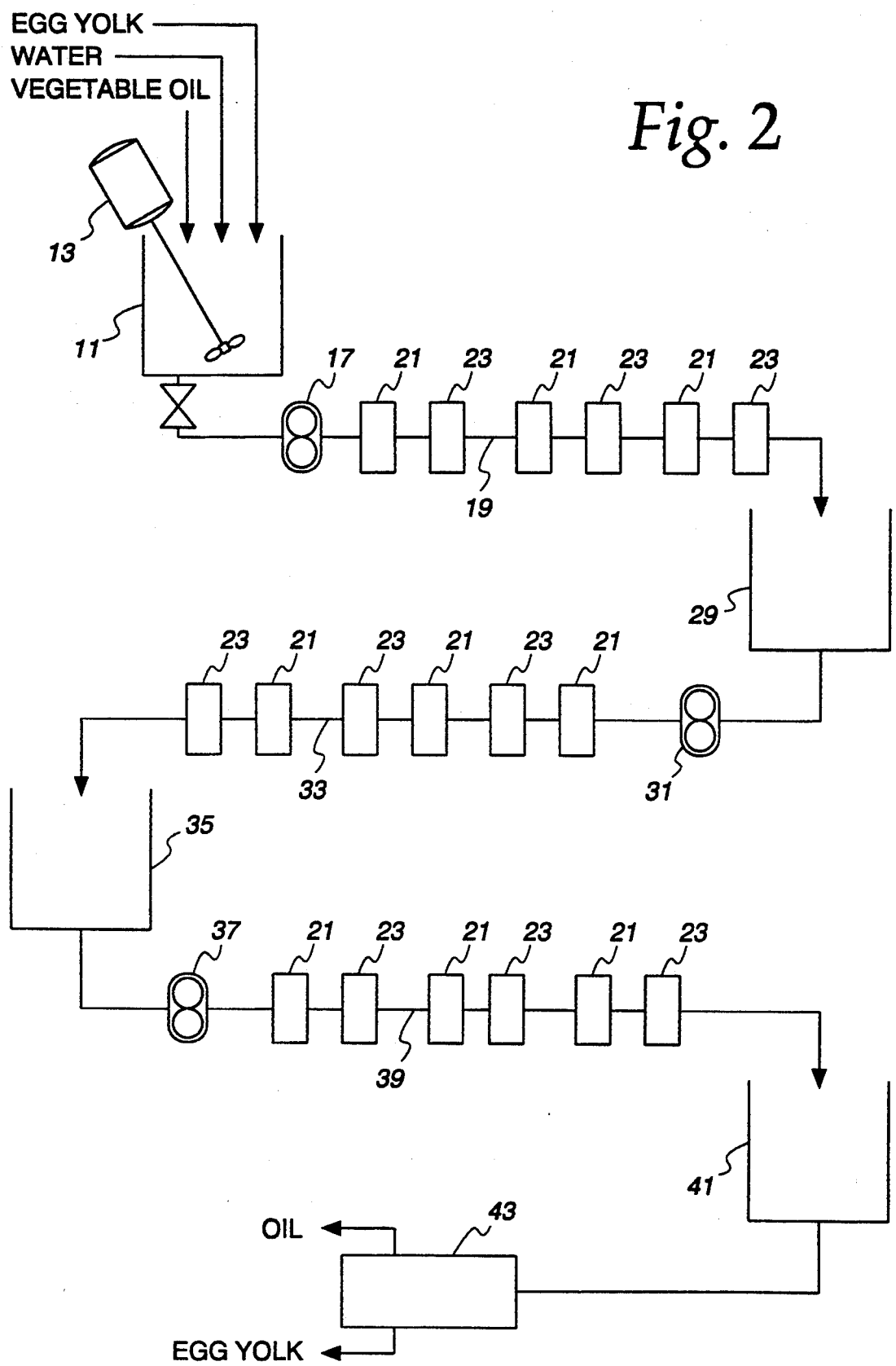
FIG. 2 is a schematic flow diagram of a multi-stage embodiment of the invention.

The process of the present invention can be made continuous by inserting a series of orifices and screens in a conduit. As shown in FIG. 2, the ingredients are continuously added to a premixing tank 11 and are pumped through a conduit 19 by pump 17. The conduit 19 contains a series of orifices 21 and screens 23. When the pressure drop imparted by the first pump 19 decreases to within the range of from about 120 to about 150 psig, the mixture can be transferred to a surge tank 29 and boosted in pressure by a second pump 31. The mixture is then transferred through a conduit 33 which has additional orifices and screens interspersed along the length of the conduit. The pressure can again be boosted by means of a second surge tank 35 and a third pump 37 again dispersing additional orifices and screens along the length of a conduit 39. After a suitable number of passes through the series of orifices and screens, the mixture is pumped to a final surge tank 41 prior to separating the oil and egg yolk phases in a centrifuge 43.

In another embodiment of the invention, natural egg white, having about 12% solids, is subjected to membrane treatment to provide a retentate with increased solids and a permeate. Membrane treatment, such as reverse osmosis and ultrafiltration is well known in the food art. The egg white retentate has from about 15% to about 20% solids. The egg white permeate may be used to adjust the moisture level of the egg yolk/vegetable oil mixture, which is treated by the method of the present invention to reduce the cholesterol and saturated fat content of the egg yolk.

After treatment to remove cholesterol and recovery of the egg yolk, the egg yolk can be combined with natural egg white or the egg white retentate to provide an egg product having the flavor, texture and cooking properties of natural egg, but with greatly reduced cholesterol and saturated fat.

The following examples further illustrate various features of the invention, but are not intended to limit the scope of the invention as set forth in the appended claims.

EXAMPLE 1

Fresh egg yolk having 43% egg yolk solids was combined with soybean oil at oil to egg yolk ratios of 0.6:1 and 0.8:1 insufficient quantities to provide 50 pounds of an oil and egg yolk premix. The premix was transferred to a 25 gallon tank and preheated to a temperature of 139°–143° F. The premix was then pumped with a Waukesha 30 pump from the bottom of the tank through a 1" conduit in a recirculating loop back to the top of the tank at a flow rate of 120 lbs/min. The conduit is provided with $\frac{3}{8}$" orifice and a 50 mesh screen mounted 8 inches downstream from the orifice and transversely to the flow of the premix.

The results of processing three batches is set forth hereinbelow in Table 1.

TABLE 1

| Pass | Yolk Solids | Adjusted Cholesterol mg/100 gm | Chol Reduc. |
| --- | --- | --- | --- |
| Batch #1 | | | |
| 0 | 0.4312 | 852.39 | 0 |
| 15 | 0.4003 | 584.89 | 31.38% |
| 25 | 0.3748 | 359.44 | 57.83% |
| 35 | 0.3665 | 345.22 | 59.50% |
| 45 | 0.3663 | 335.12 | 60.69% |
| 60 | 0.3679 | 358.89 | 57.90% |
| Batch #2 | | | |
| 15 | 0.4004 | 539.14 | 36.75% |
| 25 | 0.37 | 380.31 | 55.38% |
| 35 | 0.36 | 308.84 | 63.77% |
| 45 | 0.36 | 302.18 | 64.55% |
| 60 | 0.35 | 347.18 | 59.27% |
| Batch #3 | | | |
| 15 | 0.4 | 557.69 | 34.57% |
| 25 | 0.37 | 441.53 | 48.20% |
| 35 | 0.36 | 304.06 | 64.33% |
| 45 | 0.36 | 320.78 | 62.37% |
| 60 | 0.359 | 319.16 | 62.56% |

EXAMPLE 2

Fresh egg yolk having 46% solids was combined with soybean oil and egg white permeate in a ratio of 1.6:1.0:0.4 (oil to yolk to permeate) to provide 300 pounds of premix. The egg white permeate was produced during the concentration of egg whites. The premix was heated to 138°–142° F. by recirculation through a heat exchanger. The mixture was then pumped from a 150 gallon tank through 1" conduit in a recirculation loop back to the tank at a flow rate of 100 lbs/min. The conduit was provided with a $\frac{3}{8}$" orifice and a #50 mesh screen mounted 8" downstream from orifice and transverse to the flow.

The results of this extraction are provided in Table 2.

TABLE 2

| Pass | Yolk Phase Solids - % | % of Native Yolk Fat Removed | Adjusted Cholesterol mg/100 g | Cholesterol Reduction |
| --- | --- | --- | --- | --- |
| 0 | 33 | 0.0% | 761 | 0% |
| 5 | 30 | 19.3% | 527 | 31% |
| 10 | 28.5 | 29.1% | 409 | 46% |
| 15 | 26.5 | 42.0% | 278 | 63% |
| 20 | 24.5 | 53.2% | 223 | 71% |
| 25 | 24 | 55.6% | 214 | 72% |
| 30 | 24 | 56.0% | 197 | 74% |
| 35 | 23.9 | 56.8% | 190 | 75% |

The yolk phase was separated from the cholesterol enriched oil after the 35 pass. This cholesterol and fat reduced yolk phase was then combined with corn oil and concentrated egg white in a 1.0:0.13:0.90 yolk to oil to whites ratio. The white has been concentrated to a solids level of 16.25%. This recombination resulted in a 75% cholesterol reduced egg product with a protein and fat content equal to a whole egg. This egg product had an acceptable flavor and

EXAMPLE 3

Salted, pasteurized egg yolk having 48% solids was combined with soybean oil, water and salt in a ratio of 1.6:1.0:0.33:0.07 (oil to yolk to water to salt) to provide 250 pounds of premix. The premix was heated to 138°–142° F. by recirculation through a heat exchanger. The mixture was then pumped from a 150 gallon tank through 1" conduit in a recirculation loop back to the tank at a flow rate of 120 lbs/min. The conduit was provided with a $\frac{3}{8}$" orifice and a #50 mesh screen mounted 8" downstream from orifice and transverse to the flow.

The results of this extraction are provided in Table 3.

TABLE 3

| Pass | Yolk Phase Solids - % | % of Native Yolk Fat Removed | Adjusted Cholesterol mg/100 g | Cholesterol Reduction |
| --- | --- | --- | --- | --- |
| 0 | 39 | 0.0% | 625 | 0% |
| 5 | 37 | 22.9% | 417 | 33% |
| 10 | 35.5 | 37.0% | 307 | 51% |
| 15 | 34.4 | 46.3% | 227 | 64% |
| 20 | 33.5 | 53.0% | 177 | 72% |
| 25 | 33.3 | 54.8% | 151 | 76% |
| 30 | 33 | 55.9% | 141 | 77% |
| 35 | 33 | 55.9% | 133 | 79% |

The yolk phase was separated from the cholesterol enriched oil after the 35 pass. The cholesterol and fat reduced salted yolk is suitable for use as an ingredient in food products.

What is claimed is:

1. A method for extracting cholesterol from egg yolk comprising:
   (a) providing a mixture of egg yolk solids, water and oil;
   (b) subjecting said mixture to moderate shear extraction conditions which prevent the formation of oil-in-water emulsions by repetitively pumping said mixture in a flowing stream through a conduit provided with at least one orifice having a diameter of from about $\frac{3}{8}$ inch to about $\frac{1}{2}$ inch for a 1 inch conduit and proportionally equivalent orifice sizes for other conduit sizes and at least one screen which is from about 40 to about 50 mesh, U.S. standard sieve size mounted transversely to said flowing stream on the downstream side of said orifice, wherein each part of said mixture is caused to pass through said orifice and said screen a number of times equivalent to passing through a series of orifices and screens equivalent to from about 10 to about 35 pairs of orifices and screens; and (c) separating said mixture into separate water and oil phases, wherein at least about 70% of the cholesterol from said egg yolk is retained in the oil phase and the egg solids are retained in the water phase.

2. A method in accordance with claim 1 wherein said screen is positioned from about 6 inches to about 24 inches from said orifice.

3. A method in accordance with claim 1 wherein said flowing stream has a Reynolds number of from about 4000 to about 12000 after passing through said orifice.

4. A method in accordance with claim 1 wherein said conduit has a one inch inside diameter and said flowing stream is pumped at a rate of from about 50 to about 200 pounds per minute.

5. A method in accordance with claim 1 wherein the pressure drop through said orifice and screen is from about 120 psig to about 150 psig.

* * * * *